June 6, 1967 C. C. HALL 3,324,399

LINEAR PHASE DEMODULATOR

Filed June 19, 1964 2 Sheets-Sheet 1

INVENTOR.
CLIFFORD C. HALL

BY

Brumbaugh, Free, Graves & Donohue his ATTORNEYS

June 6, 1967 C. C. HALL 3,324,399

LINEAR PHASE DEMODULATOR

Filed June 19, 1964 2 Sheets-Sheet 2

INVENTOR.
CLIFFORD C. HALL

BY

Brumbaugh, Free, Graves & Donohue his ATTORNEYS

United States Patent Office 3,324,399

Patented June 6, 1967

3,324,399

LINEAR PHASE DEMODULATOR

Clifford C. Hall, Washington, D.C., assignor to Vitro Corporation of America, New York, N.Y., a corporation of Delaware Filed June 19, 1964, Ser. No. 376,380
7 Claims. (Cl. 329—103)

This invention relates to a method and apparatus for demodulating a phase modulated signal and, more particularly, for demodulating with a high degree of linearity a phase modulated signal having relatively large phase deviations.

Conventional phase demodulators usually employ the well known discriminator, balanced detector or ratio detector of a frequency modulation detection system in conjunction with a corrective network to compensate for the different variation of modulation index with modulating frequency, as is well known to the art. This corrective network must have a frequency response such that its output is inversely proportional to the modulating frequency. It is very difficult to obtain such a characteristic over the frequency bandwidth normally encountered without introducing considerable distortion. Furthermore, the abovementioned frequency modulation detectors use tuned circuits and transformers in converting frequency modulation to amplitude modulation in the detection process, so that such a demodulator is linear only over a relatively narrow range of phase deviation and may be used for phase modulated signals of only one carrier frequency.

These difficulties of conventional phase demodulators are overcome in the present invention by symmetrically clipping a phase modulated signal generated by phase modulating a carrier signal, shifting the phase of a reference signal which is in phase with the carrier signal, clipping the phase shifted reference signal, applying the clipped phase modulated signal and the clipped reference signal to a concidence or "and" circuit, and integrating the output of the coincidence circuit to recover the information communicated by the phase modulated signal. Inasmuch as the demodulator responds only to the zero crossings of the phase modulated and reference signals, and because of the shift effected in the phase of the reference signal, the output of the demodulator according to the invention is linearly proportional to the phase difference between the two signals over a greater range than would be otherwise possible. Furthermore, this is accomplished without the use of transformers or tuned circuits.

The invention is more fully explained in the following detailed description of an exemplary embodiment, this description being illustrated by the accompanying drawings, in which.

Figure 1:
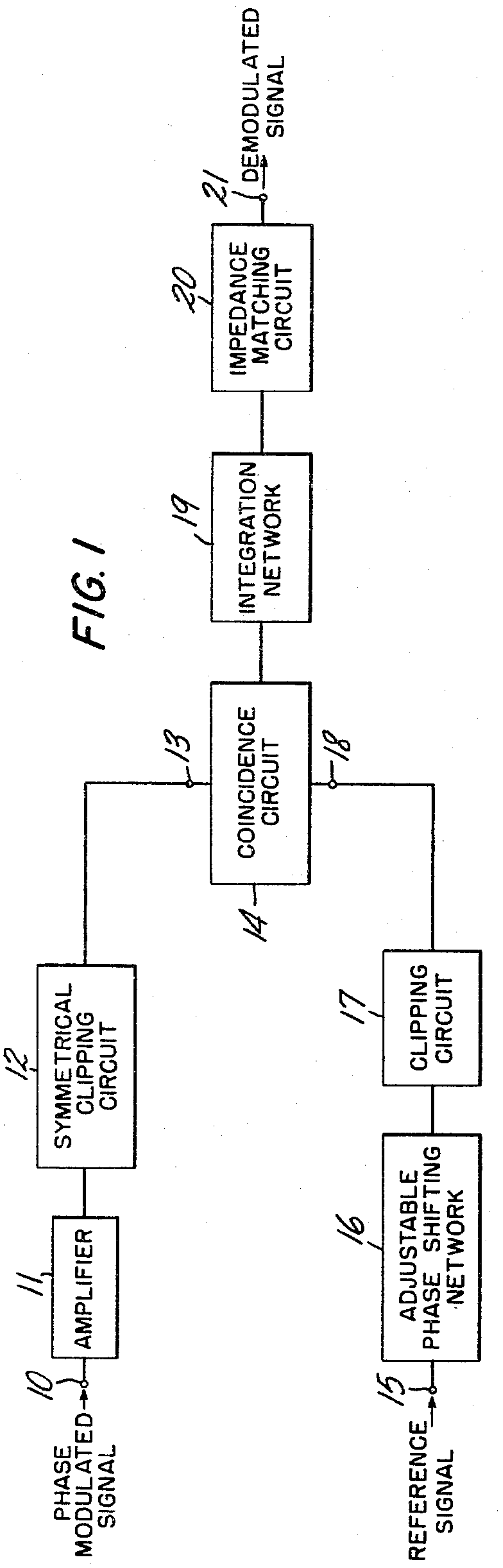
FIGURE 1 is a block diagram of a linear phase demodulator embodying the invention.

In the embodiment of the invention shown by way of example in FIG. 1, a phase modulated signal is applied to a terminal 10 which is connected directly to an amplifier stage 11, which is preferably of the linear type. This phase modulated signal might be obtained from the output of an intermediate frequency amplifier (not shown), for example. The amplifier 11 is followed by a wave-shaping circuit such as a symmetrical clipping circuit 12. The amplification of the amplifier stage is such that the zero crossings of the square wave output from the clipping circuit 12 correspond to the zero crossings of the phase modulated signal applied to the terminal 10. The output from this symmetrical clipper is applied to a first input terminal 13 of a coincidence or "and" circuit 14.

A reference signal is applied to a terminal 15. The reference signal must be of the same frequency as the carrier frequency of the phase modulated signal applied to the terminal 10. The reference signal might be generated by passing the phase modulated signal through a crystal filter (not shown), for example. The reference signal passes through an adjustable phase shifting network 16, which is adjusted according to the frequency of the reference signal to shift the phase of this signal by 90 degrees in order to utilize the full capability of the demodulator, as will be more fully explained below. The phase shifted reference signal is then applied to a clipping circuit 17, the output of which is a square wave the zero crossings of which correspond to the zero crossings of the phase shifted reference signal. The square wave output from the clipping circuit 17 is fed to a second input terminal 18 of the coincidence circuit 14.

The coincidence circuit 14 has an output only when both input terminals 13 and 18 are energized. In particular, the coincidence circuit output comprises pulses of rectangular wave shape, the duration of which pulses coincides with the period during which both terminals 13 and 18 are energized. The output pulses from the coincidence circuit are applied to an integration network 19, where the information communicated by the phase modulated signal is separated from the carrier frequency components. An impedance matching circuit 20 follows the integration network 19 in order to present the proper impedance at a terminal 21 to whatever circuit may be driven by the demodulator embodying the invention.

Figure 2:
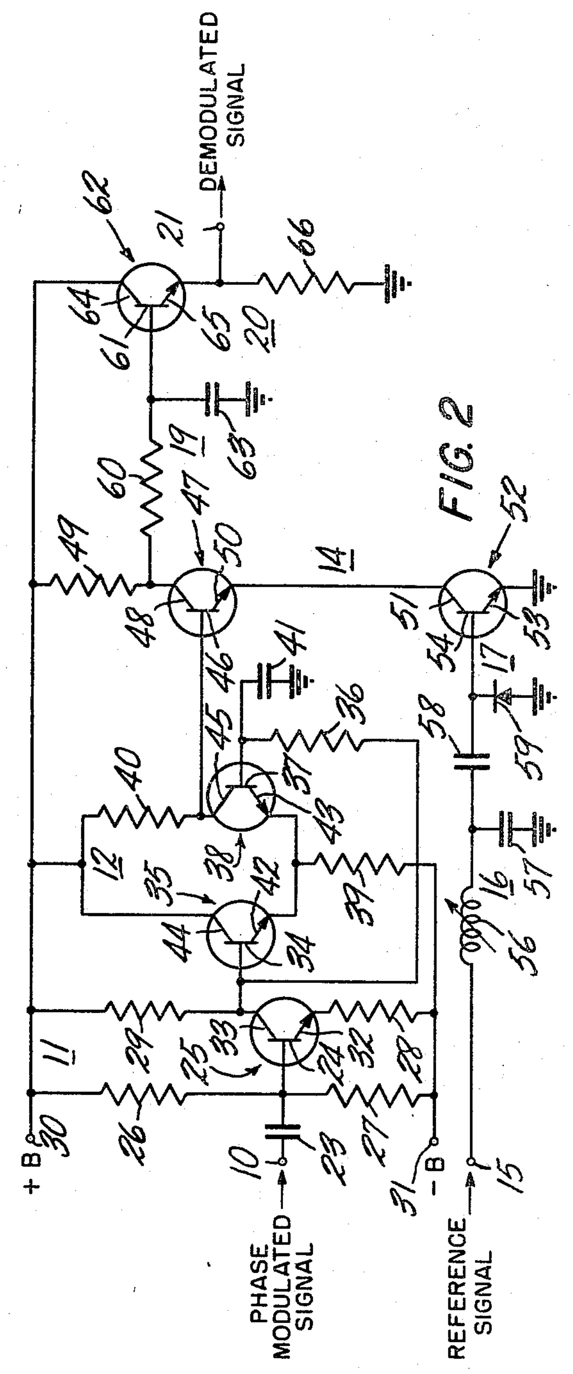
FIG. 2 is a schematic illustration of a representative electrical circuit for the demodulator of FIG. 1.

Referring now to the schematic electrical diagram of FIG. 2, a phase modulated signal applied to the terminal 10 is fed through a coupling capacitor 23 to the base 24 of a transistor 25. The transistor 25 and the resistors 26, 27, 28 and 29 comprise the linear amplifier 11. The base 24 is connected through the resistor 26 to a terminal 30 and through the resistor 27 to a terminal 31. A source of D.C. voltage (not shown) is impressed across the terminals 30 and 31, the positive voltage being applied to the terminal 30. The emitter 32 of the transistor 25 is connected through the resistor 28 to the terminal 31, while the collector 33 is connected through the resistor 29 to the terminal 30.

The collector 33 is joined to the base 34 of a transistor 35 and is connected through a resistor 36 to the base 37 of a transistor 38. The transistors 35 and 38, the resistors 36, 39, and 40, and the capacitor 41 comprise the symmetrical clipping circuit 12. The emitter 42 of the transistor 35 is joined to the emitter 43 of the transistor 38 and is connected through the resistor 39 to the terminal 31. The base 37 of the transistor 38 is connected to ground through the capacitor 41. The collector 44 of the transistor 35 is joined to the terminal 30, while the collector 45 of the transistor 38 is connected through the resistor 40 to this terminal.

The collector 45 of the transistor 38 is joined to the base 46 of a transistor 47. The collector 48 of this transistor is connected through a resistor 49 to the terminal 30. The emitter 50 is joined to the collector 51 of a transistor 52, the emitter 53 of which is grounded. The two transistors 47 and 52 together with the resistor 49 comprise the coincidence circuit 14, the one input 13 of which is to the base 46 of the transistor 47, while the other input 18 is to the base 54 of the transistor 52. The output of the coincidence circuit appears at the collector 48 of the transistor 47.

A reference signal applied to the terminal 15 is conducted to a variable inductor 56 which is connected through a capacitor 57 to ground and through a capacitor 58 to the base 54 of the transistor 52. The base 54 is also connected to ground through a crystal diode 59, the polarity of which is indicated in the drawing. The variable inductor 56 and the capacitor 57 comprise the adjustable phase shifting network 16, and the capacitor 58, the crystal diode 59 and the base-emitter junction of the transistor 52 comprise the clipping circuit 17. The collector 48 of the transistor 47 is connected through a resistor 60 to the base 61 of a transistor 62. The base 61 is connected to ground through a capacitor 63. The collector 64 is joined to the terminal 30, and the emitter 65 is grounded through a resistor 66. The resistor 60 and the capacitor 63 comprise the integration network 19, and the transistor 62 and the resistor 66 comprise the emitter-follower impedance matching circuit 20 which presents the proper impedance at the terminal 21 to whatever circuit may be driven by this demodulator.

In operation, a phase modulated signal applied to the terminal 10 is amplified by the linear amplifier 11 comprising the transistor 25. Such a linear amplifier is well known to the art and requires no detailed explanation. The output of this amplifier is applied to the symmetrical clipping circuit 12 comprising the transistors 35 and 38. Since the capacitor 41 may be considered an open circuit during steady-state conditions, the same steady-state or D.C. bias is applied to the two bases 34 and 37. For an A.C. signal, however, the capacitor 41 has negligible impedance, and so the base 37 may be considered at ground potential. Thus a small positive signal voltage applied to the base 34 will raise the potential of the emitters 42 and 43 and cut off the transistor 38. A small negative signal voltage on the base 34, however, will not lower the potential of the emitters 42 and 43 in the same fashion, since the bias on the base 37 will prevent the potential of the emitter 43 (and also of the emitter 42) from dropping below its steady-state value. Because of this clamping action occurring at the emitter 42, the small negative signal voltage on the base 34 will cut off the transistor 35. If the characteristics of the two transistors 35 and 38 are the same, the peak magnitude of the positive signal voltage which cuts off the transistor 38 will equal the peak magnitude of the negative signal voltage which cuts off the transistor 35, and therefore symmetrical clipping is achieved.

Thus, with an A.C. signal voltage of peak magnitude in excess of the value required to cut off the transistors 35 and 38, one or the other of the transistors will be cut off, and the collector current of the transistor 38 will be switched between zero and some steady value. This collector current will develop a symmetrical square wave voltage at the collector 45. The amplification of the linear amplifier 11 is such that the peak magnitude of the signal applied to the base 34 is very large with respect to the value necessary to cut off the transistors 35 and 38, so that the zero crossings of the output signal appearing at the collector 45 correspond to those of the phase modulated input signal.

A reference signal which is in phase with the unmodulated carrier of the phase modulated signal is applied to the terminal 15. This reference signal might be obtained by passing the phase modulated signal through a crystal filter tuned to the carrier frequency, for example. The reference signal is passed through the adjustable phase shifting network 16 comprising the variable inductor 56 and the capacitor 57. Such a phase shift network is well known to the art and requires no detailed explanation. The phase shifted reference signal is then applied to the clipping circuit 17 comprising the capacitor 58, the crystal diode 59 and the base-emitter junction of the transistor 52. The base-emitter junction forms essentially a diode the polarity of which is opposite that of the diode 59. The capacitor 58 provides a sufficient series impedance so that the phase shifted reference signal is clipped to a square wave which appears at the base 54.

The transistors 47 and 52 comprises the coincidence circuit 14, the input 13 of which is to the base 46 of the transistor 47 and the input 18 of which is to the base 54 of the transistor 52. The symmetrically clipped phase modulated signal is applied to the base 46, and the clipped phase shifted reference signal is applied to the base 54. The variable inductor 56 is adjusted to obtain a 90 degree phase difference between these two signals. In order for current to flow in the series circuit comprising the transistors 47 and 52 and the resistor 49, a positive saturating voltage must be applied simultaneously to the bases 46 and 54, the inputs 13 and 18 of the coincidence circuit 14.

Figures 3, 4:
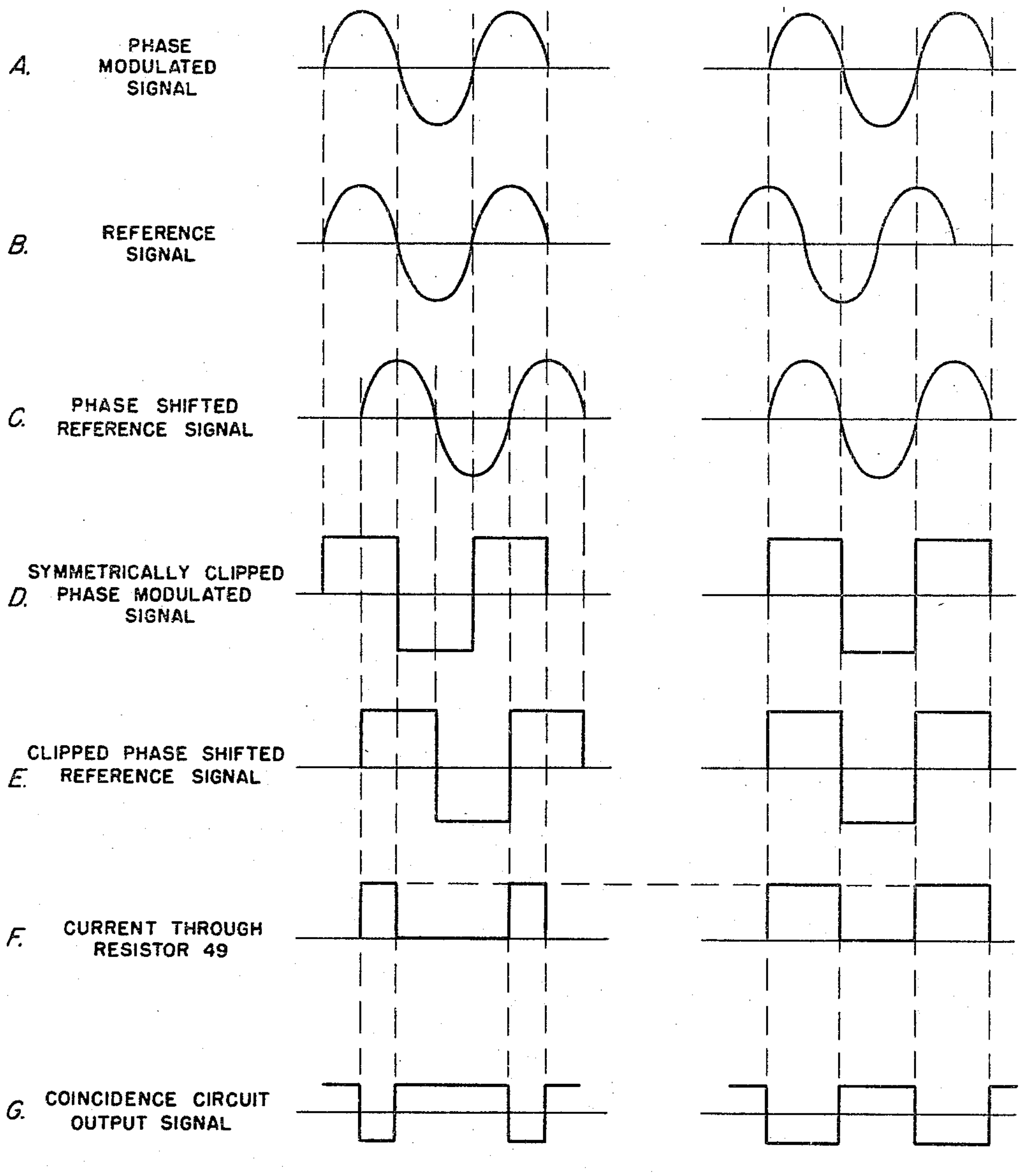
FIG. 3 is a diagram of waveforms at various points of the demodulator when the input is an unmodulated carrier signal.
FIG. 4 is a diagram of waveforms at the points selected in FIG. 3 when the input is a phase modulated signal, the instantaneous phase of which lags that of the carrier by 90 degrees.

FIGS. 3 and 4 show waveforms at various points of the demodulator when the input is an unmodulated carrier signal and a phase modulated signal the instantaneous phase of which lags that of the carrier by 90 degrees, respectively. As pointed out above, the reference signal is in phase with the unmodulated carrier. If the signal applied to the terminal 10 is unmodulated (FIG. 3), there will be a 90 degree phase difference between the signals applied to the bases 46 and 54 (FIGS. 3D and 3E, respectively), due to the 90 degree phase shift in the reference signal effected by the phase shifting network 16, and so current will flow through the resistor 49 for one-quarter cycle or 90 degrees (FIG. 3F). If a modulated signal is applied to the terminal 10 having an instantaneous phase lag of 90 degrees with respect to the carrier (FIG. 4), the signals applied to the bases 46 and 54 (FIGS. 4D and 4E, respectively) will be in phase because of the 90 degree phase shift effected in the reference signal, and so current will flow through the resistor 49 for one-half cycle or 180 degrees (FIG. 4F). Similarly, of the instantaneous phase of the modulated signal leads that of the carrier by 90 degrees, the signals applied to the bases will have a phase difference of 180 degrees, and no current will flow through the resistor 49.

Thus, as the relative instantaneous phase between the phase modulated signal and the reference signal is varied through 180 degrees (plus or minus 90 degrees), the duration of the voltage pulse produced at the collector 48 (FIGS. 3G and 4G) will be linearly proportional to the phase difference between the signals applied to the terminals 10 and 15, varying between zero and 180 degrees, since the reference signal has been shifted by 90 degrees. If a phase shift were not effected in the reference signal, the demodulator could not distinguish a phase lead from a phase lag between the phase modulated signal and the reference signal. Thus the range of phase difference between these signals over which the demodulator output is linear is greatly expanded by shifting the phase of the reference signal. The amplitude of the voltage pulse will be constant, since the current flowing through the resistor 49 will switch between zero and some steady value determined by the equivalent resistance of the transistors 47 and 52 when saturated, the resistor 49 and the potential of the terminal 30 with respect to ground.

The pulses produced at the collector 48 are applied to the resistor 60 and the capacitor 63, comprising the integration network 19. The purpose of this integration network is to separate the information communicated by the phase modulated signal from the carrier frequency components. The demodulated output from the integration network is fed to the emitter-follower impedance matching circuit 20 comprising the transistor 62 and the resistor 66, whereby the proper impedance is presented at the terminal 21 to the circuit that is driven by the demodulator.

Thus there is provided, in accordance with the invention, a phase demodulator which responds only to the zero crossings of the phase modulated and reference signals and which produces a high degree of linearity for phase deviations up to plus or minus 90 degrees. Furthermore, the use of solid state components throughout and avoidance of transformers and tuned circuits not only contribute toward improved linearity and reduced distortion, but make the demodulator suitable for a wide range of carrier frequencies. Only the variable inductor 56 need be adjusted to obtain the proper phase shift of the reference signal.

While a specific exemplary embodiment of the invention has been shown and described, it will be understood that various substitutions, changes and modifications in the form and details of the illustrated embodiment and its manner of operation may be made by those skilled in the art without departing from the spirit of the invention. All such variations and modifications, therefore, are included within the intended scope of the invention as defined by the following claims.

I claim:

1. Apparatus for demodulating a phase modulated signal, the phase of which varies with respect to its carrier signal, comprising means for clipping the phase modulated signal, means for shifting the phase of a reference signal which is in phase with the carrier signal to produce a phase shifted reference signal, means coupled to said phase shifting means for clipping said phase shifted reference signal, and coincidence circuit means responsive to said clipped phase modulated signal and to said clipped phase shifted reference signal for generating a signal having pulses of constant amplitude, the duration of said pulses being coincident with the respective periods during which said clipped phase modulated signals and said clipped phase shifted reference signal are of the same polarity.

2. Apparatus as claimed in claim 1, wherein said means for clipping the phase modulated signal is symmetrical and said phase shifting means comprises an adjustable phase shifting network.

3. Apparatus as claimed in claim 2, including means coupled to said generating means for integrating said generating signal.

4. Apparatus for demodulating a phase modulated signal, the phase of which varies with respect to its carrier signal, comprising a first transistor having an emitter, a base and a collector, the phase modulated signal being applied to said base;

a second transistor having an emitter, a base and a collector; said emitters of said first and second transistors being coupled together;

a first resistor having one end connected to said coupled emitters and another end connected to a first reference potential;

a second resistor connected between said bases of said first and second transistors;

a capacitor having one end connected to the base of said second transistor and another end connected to a second reference potential;

a third resistor having one end connected to said collector of said second transistor and another end connected to said collector of said first transistor and to a third reference potential; a symmetrical square wave being produced at said collector of said second transistor;

means for shifting the phase of a reference signal which is in phase with the carrier signal to produce a phase shifted reference signal;

means coupled to said phase shifting means for clipping said phase shifted reference signal; and means responsive to said symmetrical square wave and to said clipped phase shifted reference signal for generating a signal having pulses of constant amplitude, the duration of said pulses being coincident with the respective periods during which said symmetrical square wave and said clipped phase shifted reference signal are of the same polarity.

5. A symmetrical clipping circuit for producing a symmetrical square wave output in response to an alternating current signal, comprising a first transistor having an emitter, a base and a collector;

a second transistor having an emitter, a base and a collector; said emitters of said first and second transistors being coupled together;

a first resistor having one end connected to said coupled emitters and another end connected to a first reference potential;

a second resistor connected between said bases of said first and second transistors;

a capacitor having one end connected to the base of said second transistor and another end connected to a second reference potential; and a third resistor having one end connected to said collector of said second transistor and another end connected to said collector of said first transistor and to a third reference potential;

the alternating current signal being applied to said base of said first transistor to produce a symmetrical square wave output at said collector of said second transistor.

6. Apparatus for demodulating a phase modulated signal, the phase of which varies with respect to its carrier signal, comprising a first transistor, a second transistor coupled to said first transistor, means responsive to a positive voltage swing of a certain magnitude of the phase modulated signal for cutting off one of said transistors and to a negative voltage swing of the same magnitude of the phase modulated signal for cutting off the other of said transistors for generating a symmetrical square wave, means for shifting the phase of a reference signal which is in phase with the carrier signal to produce a phase shifted reference signal, means coupled to said phase shifting means for clipping said phase shifted reference signal, means responsive to said symmetrical square wave and to said clipped phase shifted reference signal for generating pulses of constant amplitude, the duration of said pulses being coincident with the respective periods during which said symmetrical square wave and said clipped phase shifted reference signal are of the same polarity, and means for integrating said generated pulses.

7. A symmetrical clipping circuit for producing a symmetrical square wave output in response to an alternating current signal, comprising a first transistor having an emitter, a base and a collector;

a second transistor having an emitter, a base and a collector; said emitters of said first and second transistors being coupled together;

a first resistor having one end connected to said coupled emitters and another end connected to one reference potential;

means for biasing the base of said second transistor at a bias potential, means for clamping the base of said second transistor at the bias potential, and a second resistor having one end connected to said collector of said second transistor and another end connected to said collector of said first transistor and to another reference potential;

the alternating current signal being applied to said base of said first transistor to produce a symmetrical square wave output at said collector of said second transistor.

References Cited

UNITED STATES PATENTS

| | | | |
|---|---|---|---|
| 3,073,972 | 1/1963 | Jenkins | 307—88.5 |
| 3,254,241 | 5/1966 | Rogers et al. | 307—88.5 |

FOREIGN PATENTS

| | | |
|---|---|---|
| 703,189 | 1/1964 | Great Britain. |

ROY LAKE, *Primary Examiner.*

A. L. BRODY, *Assistant Examiner.*